United States Patent [19]

Yasuda et al.

[11] Patent Number: 4,674,588
[45] Date of Patent: Jun. 23, 1987

[54] ELECTRIC POWER STEERING EQUIPMENT

[75] Inventors: Tomio Yasuda, Kasukabe; Akio Hashimoto, Kawasaki, both of Japan

[73] Assignee: Aisin Seiki Kabushiki Kaisha, Kariya, Japan

[21] Appl. No.: 626,203

[22] Filed: Jun. 29, 1984

[30] Foreign Application Priority Data

Aug. 8, 1983 [JP] Japan .................... 58-144795

[51] Int. Cl.⁴ .................................. B62D 5/06
[52] U.S. Cl. .......................... 180/142; 180/79
[58] Field of Search .............. 180/79, 141, 142

[56] References Cited

U.S. PATENT DOCUMENTS

| 4,392,540 | 7/1983 | Michio | 180/142 |
| 4,448,275 | 5/1984 | Kitagawa | 180/142 |
| 4,527,653 | 7/1985 | Agarwal | 180/79 |
| 4,531,082 | 7/1985 | Yoshinada | 180/142 |
| 4,538,698 | 9/1985 | Hashimoto | 180/142 |

FOREIGN PATENT DOCUMENTS

| 2851773 | 6/1980 | Fed. Rep. of Germany | 180/142 |
| 3100067 | 2/1982 | Fed. Rep. of Germany | 180/142 |
| 3124181 | 1/1983 | Fed. Rep. of Germany | 180/142 |
| 0073754 | 6/1980 | Japan | 180/142 |

Primary Examiner—Carl Stuart Miller
Attorney, Agent, or Firm—Banner, Birch, McKie & Beckett

[57] ABSTRACT

Improved electric power steering equipment includes an electric motor as a driving device therefor wherein wetness detecting means is adapted to minimize reduction in the torque necessary for the steering operation to thereby improve the steering feeling of a driver. The wetness detecting means detects the degree of wetness of a vehicle or a road surface adjacent to the vehicle. The equipment according to the present invention also includes a control means for driving the electric motor in response to the steering torque detected by a torque detecting means and the degree of wetness detected by the wetness detecting means. Thus, wetness on a road is directly or indirectly detected by the wetness detecting means and based on the detecting results thereof, additional torque necessary for the steering operation is controlled, and therefore a driver can drive a vehicle with a relatively constant steering feeling at all times, regardless of various running states of the vehicle.

17 Claims, 17 Drawing Figures

ELECTRIC POWER STEERING EQUIPMENT

BACKGROUND OF THE INVENTION

1. Field of the Invention

This invention relates to improved electric power steering equipment wherein additional steering torque is generated by an electric motor to aid the driver of a vehicle in a steering operation, and more particularly to control means for controlling drive of the electric motor to generate proper additional torque thereby to provide a constant steering feeling to the drive regardless of various running conditions of the vehicle.

2. Description of the Prior Art

Power steering equipment has been known as a means for helping a driver to steer an automobile. This power steering equipment generates a driving force in accordance with the steering operation by the driver and transmits the driving force thus generated to a steering gear. Most power steering equipment put to practical use at the present time is actuated by a hydraulic drive. That is, the hydraulic drive for the power steering equipment is provided with a control valve, a hydraulic cylinder and associated components to generate an additional steering torque by moving oil within the cylinder in accordance with the steering operation.

However, the control valve, the hydraulic cylinder and so forth are large in size and therefore a disadvantage is encountered such as large pressure loss within pipes connecting them. To prevent this pressure loss, the pipes must not be bent with a curvature of less than a predetermined curvature. In the hydraulic drive, moreover, a seal must also be securely effected so as not to leak oil. Further, handling of the equipment at the time of installation thereof is difficult. Therefore, in the case of a vehicle not having enough mounting space in the engine compartment, such as a front wheel drive vehicle, it is further difficult to mount the power steering equipment therein. Therefore, it becomes preferable to use an electric motor as a driving device for the power steering equipment. In this case, various needed controls for the equipment can be easily performed.

Generally, the torque required for the steering operation varies inversely with the vehicle's speed. Namely, when the vehicle speed is low, large steering torque is required for the steering operation. In contrast, as the vehicle speed increases, it is possible to operate the steering wheel with smaller torque input. For a vehicle not having power steering equipment, when it is in a stopped state or in a low speed running state, large steering torque is required to operate the steering wheel of the vehicle. In contrast, with power steering equipment it is possible for the driver to operate the steering wheel with relatively small torque input.

On the other hand, if the power steering equipment is operated at a time when the vehicle is running at high speed, it is possible for the steering torque required of a driver to excessively decrease. Thus, if the steering torque required of a driver is decreased at the high speed running state of the vehicle, there is a possibility that the driver will excessively rotate the steering wheel due to inexperience with the power steering equipment.

Accordingly, the present invention proposes electric power steering equipment in which additional steering torque is at least controlled in accordance with the vehicle speed.

However, even if the vehicle speed is constant, the total torque required to actually steer an automobile changes due to various factors other than the vehicle speed. Particularly, the aforesaid torque greatly changes according to roadway conditions such as wetness on the road. Generally speaking, the coefficient of sliding friction of tires on a road changes by a degree of 0.2 when comparing a dry road condition with a wet road condition. Thus, the total torque required to steer also greatly changes in accordance with changes of the aforesaid coefficient of sliding friction. Therefore, a driver's steering feeling also greatly changes with road conditions before and after raining, even when the veicle is running at a constant speed on the same road. In other words, if the servo ratio is constant regardless of the vehicle's speed or the wetness of the road surface, manual steering torque to be applied to a steering shaft by a driver varies with respect to the vehicle speed or wetness. Therefore, the torque input is so light for the driver to steer at either high speed or high wetness that oversteering may well occur.

SUMMARY OF THE INVENTION

Accordingly, one object of the present invention is to provide electric power steering equipment in which the change in manual steering torque required of a driver during vehicle running is reduced to be as small as possible thereby improving the steering feeling experienced by the driver.

Another object of the present invention is to provide improved electric power steering equipment which includes at least one detecting means to detect the wetness of the road surface which can vary a servo ratio in accordance with vehicle speed or wetness of the road surface.

These and other objects are achieved according to the present invention by detecting a degree of wetness of the vehicle or the road in contact with the tires of the vehicle thereby to control additional steering torque to be generated by the electric power steering equipment, in accordance with the road condition thus detected.

Improved electric power steering equipment according to the present invention comprises:
an electric motor;
coupling means for coupling a steering shaft and the electric motor;
torque detecting means for detecting a manual steering torque applied to a steering shaft by a driver;
at least one wetness detecting means for detecting a physical property which respect to wetness of the road surface opposite to the vehicle; and
control means for driving the electric motor in response to the output signal of the torque detecting means and wetness detecting means.

As a means for detecting whether a road is actually wet, the condition of the road may be directly detected, or indirectly detected by detecting the wetness condition of the vehicle. In the former case, for example, the light reflectance of the road may be detected by means of an optical detector, or a humidity sensor may be suspended from the vehicle to the road. On the other hand, in the latter case, the humidiity sensor may be directly attached to a predetermined portion of the vehicle exposed to rain, or a humidity sensor may be attached to another predetermined portion of the vehicle onto which water is spalshed from the road due to the rotation of the vehicle tires, thereby to detect the spalsh water thereon. In this latter case, for example, it may be attached to a rear portion inside of a tire housing or fender of the vehicle, or a predetermined side portion of the vehicle below the door. Or otherwise, a plurality of the aforesaid means may be employed for this purpose.

BRIEF DESCRIPTION OF THE DRAWINGS

FIG. 8b is an electric circuit diagram of block B 20 shown in FIG. 8a;

FIG. 8c is a graph illustrating an operational characteristic of the equipment shown in FIG. 8a;

FIG. 10b is an electric circuit diagram of block B 21 shown in FIG. 10a;

FIG. 10c is a graph illustrating an operational characteristic of the equipment shown in FIG. 10a;

FIG. 11a is a schematic block diagram illustratng part of an electric circuit for a further embodiment according to the present invention; and FIG. 11b is a graph illustrating an operational characteristic of the equipment shown in FIG. 11a.

DESCRIPTION OF THE PREFERRED EMBODIMENTS

Hereinafter, the present invention will be explained in more detail in accordance with preferred embodiments thereof with reference to the accompanying drawings.

Figure 1:
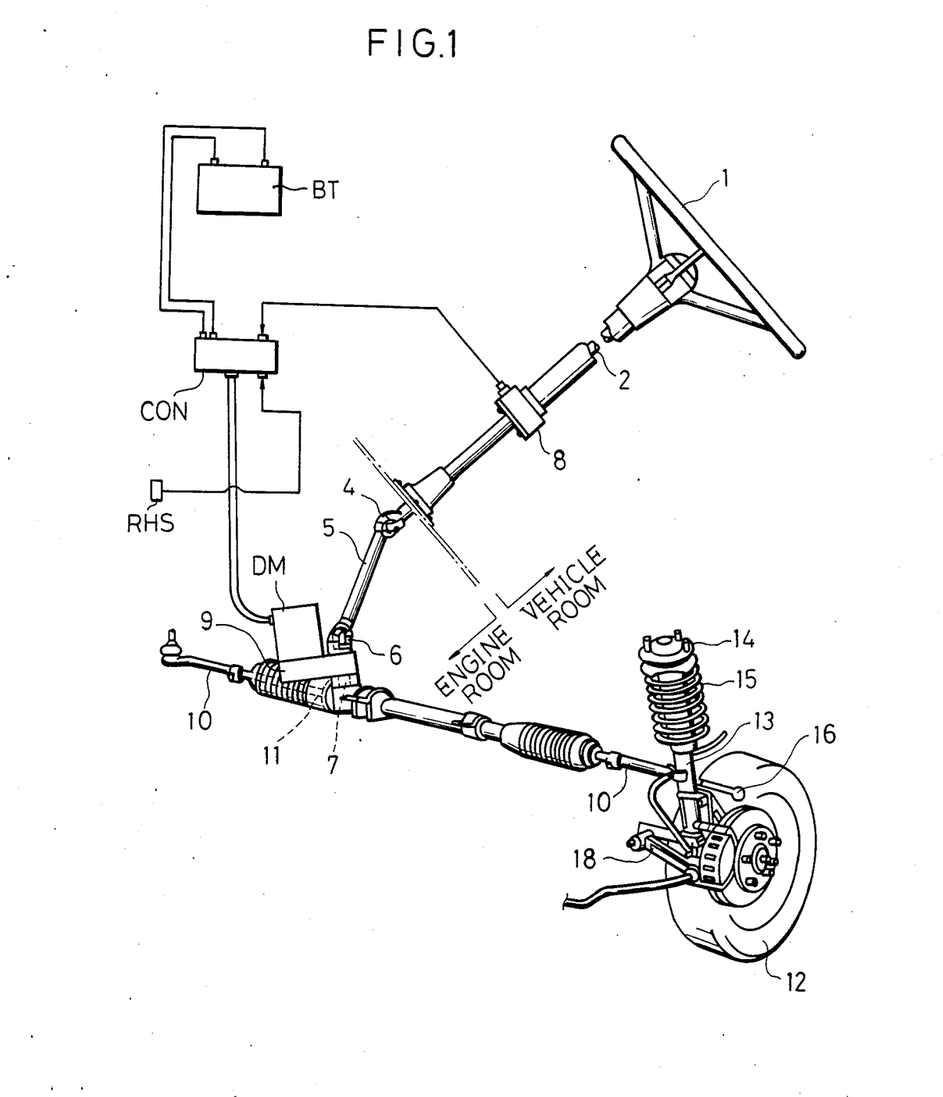
FIG. 1 is a constructional schematic view illustrating an embodiment of the electric power steering equipment according to the present invention.

Referring now to FIG. 1, there is shown a constructional schematic view of an embodiment of electric power steering equipment according to the present invention. A steering wheel 1 is connected to one end of a first steering shaft 2. The other end of the first steering shaft 2 is connected to one end of a second steering shaft 5 through a first universal joint 4. The other end of the second steering shaft 5 is connected to one end of a third steering shaft 7 through a second universal joint 6. The other end of the third steering shaft 7 is attached to a pinion gear (not shown) and this pinion gear is in engagement with a rack 11.

To the first steering shaft 2, there is fixed a torque sensor 8 as a torque detecting means, which is composed of four strain gauges. An output terminal of sensor 8 is connected to a control means (CON) for elecrically controlling the power steering equipment in this embodiment. Between the pinion gear disposed on the third steering shaft 7 and the second universal joint 6, there is also attached a reducer 9 which acts as a coupling means for coupling the steering shaft to an electric motor DM. The driving shaft of D.C. servomotor DM is coupled to reducer 9 and the D.C. servomotor DM is electrically coupled to the control means CON.

RHS designates a relative humidity sensor for detecting a physical property with respect to the wetness on a road surface. In this embodiment, the relative humidity sensor RHS is fixed to a rear portion inside of a tire housing or fender of the vehicle to detect the degree of wetness of the vehicle, whereby the wetness of the road surface is indirectly detected. In this case, a ceramic humidity sensor having positive humidity characteristics is employed as the relative humidity sensor RHS. The resistivity of the ceramic humidity sensor increases as the humidity thereof increases. The relative humidity sensor RHS is also electrically connected to the control means CON.

BT designates a vehicular battery as a power source of the equipment of this embodiment. The rack 11 is coupled to a tie rod 10 and the tie rod 10 is coupled to a steering knuckle arm 16 for controlling the steering direction of tire 12. Numerals 13, 14, 15 and 18 designate a shock absorber, a suspension upper support, a coil spring and a lower suspension arm, respectively.

Figure 2:
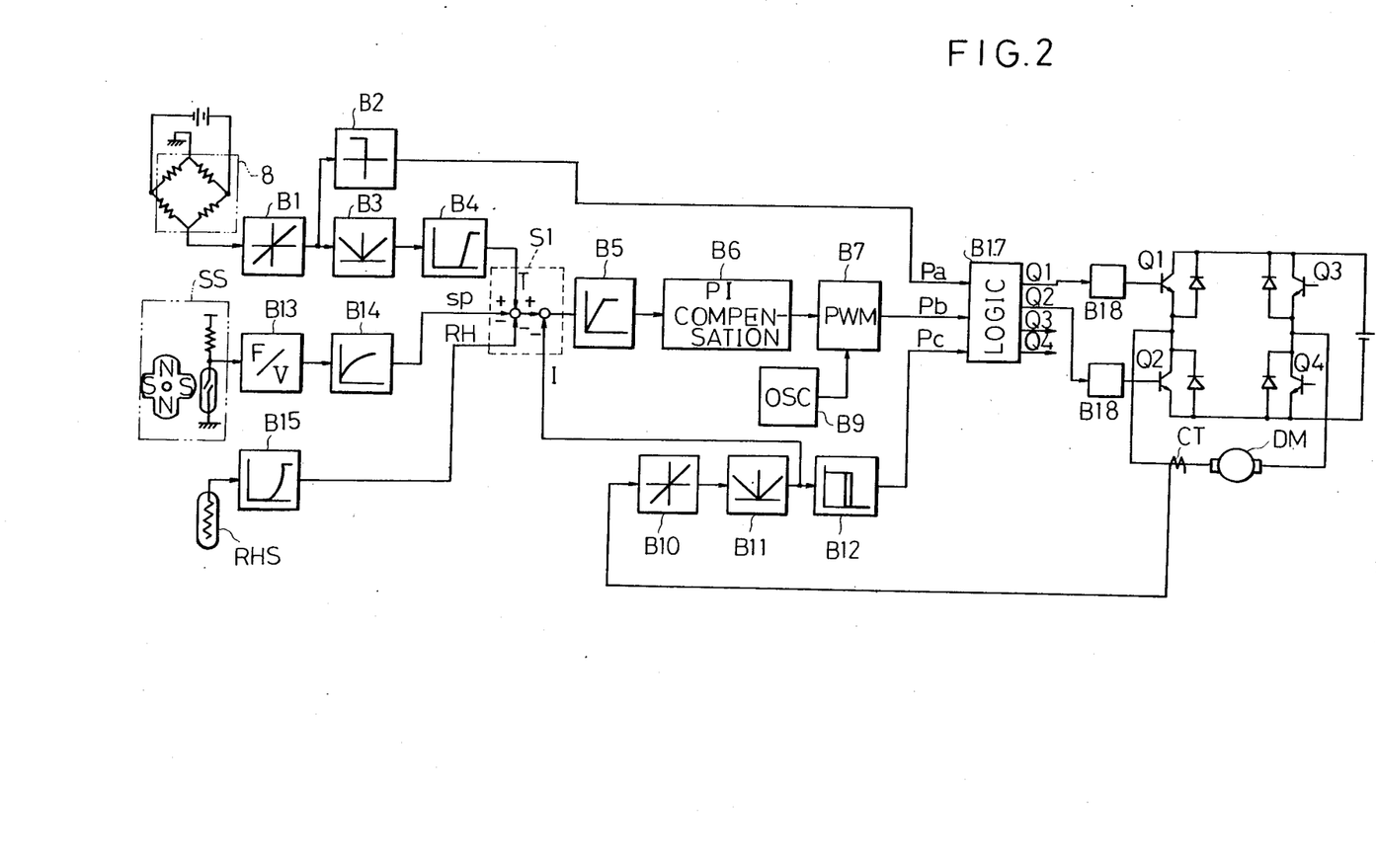
FIG. 2 is a schematic block diagram illustrating an electric circuit of the embodiment of FIG. 1.
Figure 3:
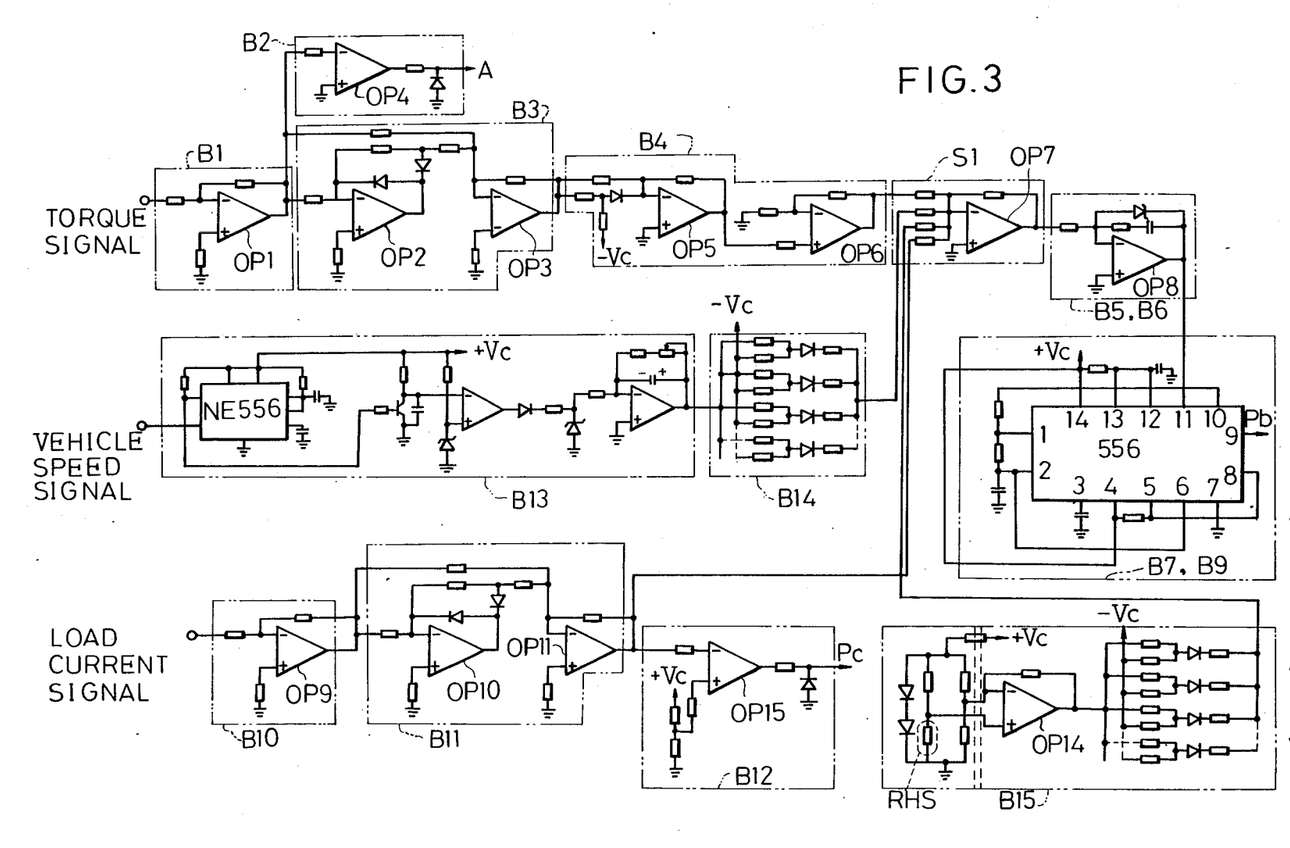
FIGS. 3 and 4 are block diagrams, each of which shows details of the block diagram of FIG. 2.
Figure 4:
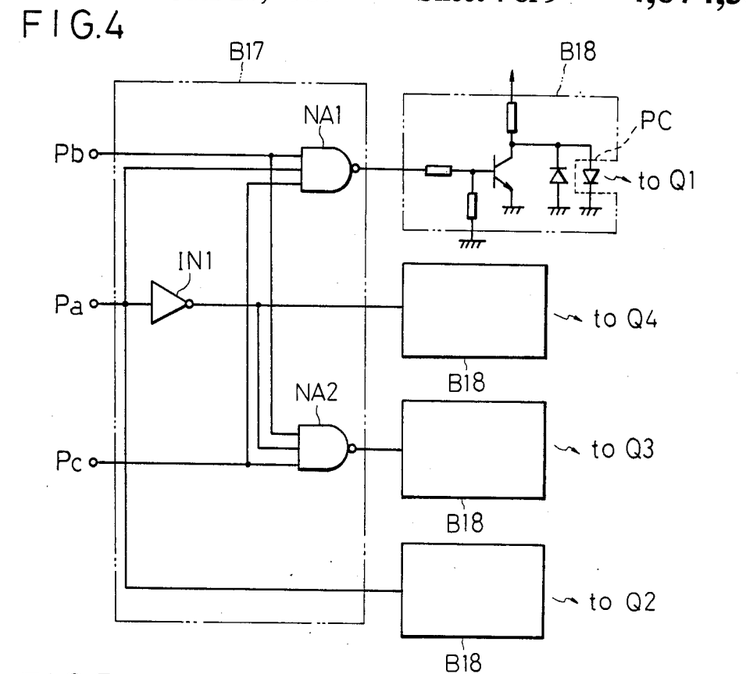

In FIG. 2, there is shown a schematic block diagram illustrating an electric circuit for the equipment shown in FIG. 1. In FIGS. 3 and 4, there are shown details of the respective blocks in FIG. 2. The graph illustrated in each of the blocks of FIG. 2 shows a schematic characteristic curve representing the relation between an input signal level and an output signal level of each of the blocks, wherein the input signal level and the output signal level are shown in the abscissa and in the odinate, respectively. In the electric circuit diagram shown in FIGS. 3 and 4, a resistor is illustrated by a small rectangular mark.

Referring now to FIGS. 2, 3 and 4, the torque sensor 8 fixed to the first steering shaft 2 is formed into a bridge circuit and an output terminal thereof is connected to an input terminal of block B1. Block B1 is composed of a linear amplifier and an output terminal thereof is connected to an input terminal of each of blocks B2 and B3. Block B2 is composed of an analogue comparator which discriminates the polarity of an input signal thereof in comparison with a 0 level and outputs a binary signal based on the discrimination. Block B3 is composed of an absolute value circuit which at all times outputs a positive polarity signal having the same level as that of the input signal regardless of the polarity of the input signal. Therefore, at the output terminal of block B2 there is obtained a signal representing polarity of the manual steering torque applied to the first steering shaft 2 by a driver, while at the output terminal of block B3 there is obtained a signal representing the absolute value of this manual steering torque.

The output terminal of block B2 is connected to an input terminal Pa of a logic control circuit B17 (FIG. 4). Whereas, the output terminal of block B3 is connected to an input terminal of block B4. Block B4 is composed of a function generator wherein the output signal level thereof is 0 when the input signal level thereof is not in excess of predetermined level, but when it is in excess of this predetermined level, then a signal having a level in accordance with the input signal level is outputted therefrom to block S1, this signal having a predetermined curve as illustrated in block B4.

According to this embodiment, ON/OFF control of current supplied to the D.C. servomotor DM is repeated within a predetermined short period of time. Thus, the duty ratio is varied thereby to adjust the torque generated by the servomotor DM. Block B7 is composed of a pulse width modulation (PWM) circuit for controlling the motor torque output. The pulse width modulation circuit of block B7 modulates the pulse width of a square-wave generated from an oscillator B9 in accordance with the signal level outputted from block B6.

Block S1 is composed of a differential amplifier. Blocks B5, B6 are composed of an amplifier provided with a limiter and a PI (Proportion Integration) compensation circuit, respectively. To the input terminals of block S1, there are applied the output signals of blocks B4, B14, B15; and B11; these representing, a steering torque signal (T), vehicle speed signal (SP), a wetness signal (RH), and a load current absolute value signal (I), respectively.

The block B14 is an output circuit in a vehicle speed signal processing means, the block B11 is an output circuit in a load current detecting means for feeding back the output (current I) of the D.C. servomotor DM, and the block B15 is an output circuit in a wetness signal processing means.

Hereinafter, the vehicle speed detecting means and the vehicle signal processing means therefor will be explained. SS designates a vehicle speed detector connected to the speedometer cable of a vehicle. A pulse signal outputted from the vehicle speed detector SS is applied to a F/V (frequency-voltage) converter B13 to be converted into a voltage signal in proportion to the vehicle speed. The signal level thereof is adjusted in a function generator B14 to be applied to the differential amplifier S1 as a vehicle speed signal SP. The function generator B14 comprises a plurality of diodes and resistors, and which has input and output characteristics with a multiple folded line shape along a predetermined exponential curve.

Next, the load current detecting means will be explained. CT designates a current transformer for detecting a current flowing through the D.C. servomotor DM. An output signal of the current transformer CT is applied to block S1 via a linear amplifier B10 and an absolute circuit B11. Block B12 is composed of an analogue comparative which is adapted to prevent overcurrent in servomotor DM. Namely, if such an overcurrent exceeding a predetermined level is detected in the analogue comparator block B12, a low level signal L is aplied to the input terminal Pc of the logic control circuit B17 to prohibit the motor drive. In this case, block B12 has a hysteresis characteristic.

Next, the wetness detecting means and the wetness signal processing means will be explained.

In this embodiment, as the wetness detecting means, a relative humidity sensor RHS is employed. The sensor RHS is connected to block B15 corresponding to the wetness signal processing means. Block B15 is provided with an amplifier and a function generator. The relative humidity sensor RHS constitutes one of the resistors formed into a bridge circuit and the output terminal is connected to an input terminal of the amplifier of block B15. The bridge circuit keeps in balance when the relative humidity is low, and it changes to an unbalanced state as the relative humidity becomes higher.

The logic control circuit B17 comprises an inverter IN1 and NAND gates NA1, NA1 and as shwon in FIG. 4. When the input signal level at terminal Pc of circuit B17 is at a high level H, the high level signal H is applied to one of input terminals of each of NAND gates NA1 and NA2. Then output level of each of the NAND gates NA1 and NA2 is defined in accordance with the state of the other two inputs to circuit B17.

Under the aforesaid state, when a signal level at input terminal Pa of circuit B17 is at a high level H, that is, manual steering torque with a normal rotational direction is being applied to the first steering shaft 2, the signal level at one of the other two input terminals of the NAND gate NA1 becomes high level H, whereas the signal level at one of the other two input terminals of the NAND gate NA2 becomes a low level L. As a result, an inversion signal of the pulse signal applied to the input terminal Pb is applied to a first base driver B18 which is connected to an output transistor Q1, therefore transistor Q1 turns on and turns off alternately. While a high level signal H is applied to each of second and third base drivers B18 that are respectively connected to output transistors Q2 and Q3, transistors Q2 and Q3 are in an OFF state, respectively. Whereas, while there is applied a low level signal L to a fourth base driver B18 connected to an output transistor Q4, transistor Q4 is in an ON state. Accordingly, alternate load current is supplied to the motor DM, and the motor DM rotates with a normal rotational direction to generate an additional steering torque.

On the other hand, in the cse where the signal level at the input terminal Pa is a low level L, that is, manual sterring torque with a reverse rotational direction is detected, the third base driver B18 connected to the transistor Q3 has an inversion signal of the pulse signal applied to the input terminal Pb, while to the second base driver B18, there is applied a low level signal L, accordingly transistor Q2 is in an ON state. Whereas, while a high level signal H is applied to each of the first and fourth base drivers B18, transistors Q1 and Q4 are in an OFF state.

Accordingly, in this case alternating load current having an opposite direction to the aforesaid is applied to the motor DM and the motor DM rotates in a reverse direction to generate an additional steering torque having a reverse direction.

The aforesaid four base drivers, which are respectively connected to four output terminals of the logic control circuit B17, control the output transistors Q1, Q2, Q3 and Q4, respectively. These four base drivers B18 have the same construction as between one another and each base driver comprises a transistor and a photocoupler PC. The photo-coupler PC includes a phototransistor as one of a pair of constitutive elements thereof. An emitter of the phototransistor is connected to the base of the corresponding output transistor, and its collector is connected to the collector of the corresponding output transistor. This connection of the phototransistor not being shown.

Figure 5:
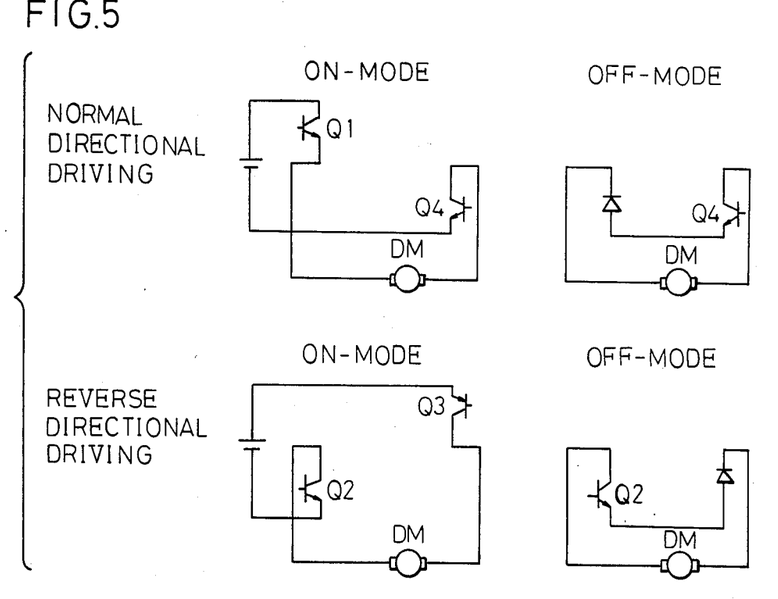
FIG. 5 is a block diagram illustrating an electrical connection state of the motor DM in each operational mode of the equipment.
Figure 6:
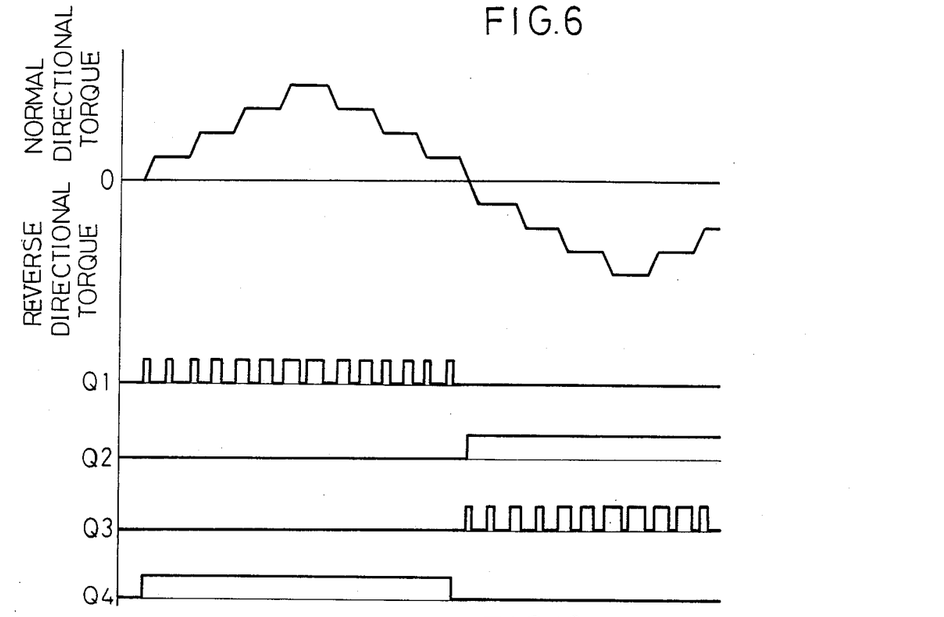
FIG. 6 is a timing chart illustrating an example of operational waveform in each predetermined portion of the equipment.

In FIG. 5, there is illustrated the electrical connection of the D.C. servomotor DM in each operational mode of the equipment, and in FIG. 6, there is shown a timing chart illustrating an example of the operational waveform at each of the selected parts of the equipment of this embodiment. The operational modes will be explained with reference to FIGS. 5 and 6.

First, when a manual steering torque with a normal rotational direction is applied to the first steering shaft 2 by the driver of a vehicle, the signal level at the input terminal Pa of the logic control circuit B17 becomes high level H so that each of the output transistors Q2 and Q3 becomes non-conductive or in an OFF state. Whereas, the output transistor Q4 is always in the conducting ON state but the output transistor Q1 becomes conductive or in the ON state only when the level of the signal to be applied to the input terminal Pb of the logic control circuit B17 is at high level H. In other cases than the above, the output transistor Q1 becomes non-conductive or in an OFF state.

In other words, a current is intermittently supplied to the D.C. sevomotor DM in a predetermined direction (the normal directional drive). Therefore, when the steering wheel 1 is rotated in the normal direction by the driver, the D.C. servomotor DM is driven to generate an additional torque with a normal drive direction. As a result, the manual steering torque input required of the driver is reduced by the amount of this additional torque. the pulse width of the output signal from the pulse width modulation circuit B7 is controlled in proportion to the output signal level of the differential amplifier S1. As the additional steering torque by the motor DM makes a reduction of the manual steering torque needed, the output signal level of block B4 reduces. As the load current signal in proportion to the additional torque inputs to the differential amplifier S1 with an inversion polarity, the output signal level of block S1 reduces. Therefore, the additional steering torque generated by the motor DM is controlled in such a negative feed back system that the difference of the input signal levels of the differential amplifier S1 reduces to a minimum stable value.

On the other hand, when manual steering torque having a reverse rotational direction is applied to the first steering shaft, each of the output transistors Q1 and Q4 turns OFF, while the output transistor Q2 turns ON and the output transistor Q3 turns ON or OFF in accordance with the modulated pulse signal. As a result, a current is intermittently supplied to the D.C. servomotor DM with a reverse direction.

Figure 7A:
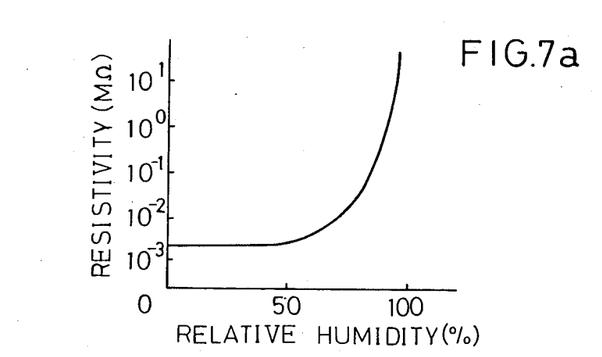
FIG. 7a is a graph illustrating the characteristics of a relative humidity sensor (RHS) with positive humidity characteristics used in the embodiment of FIG. 1.

The relative humidity sensor RHS used in this embodiment (see block B15 in FIG. 3) and shown in the graph of FIG. 7a, has positive humidity characteristics in which the resistivity thereof gradually increases as the humidity increases. Therefore, when the road is in a completely dry condition, the bridge circuit including the relative humidity sensor RHS is in balance so that the output signal RH becomes O. On the other hand, when the road is wet, the output signal RH provides a signal level in accordance with the degree of wetness on the road surface. And then, in block S1, the level of this output signal RH of block B15 is subtracted from the input signal level to be applied to the differential amplifier S1. Therefore, as the wetness on the road increases, that is, as the torque required for the steering operation (a steering torque) decreases, the additional torque to be generated by the electric power steering equipment becomes smaller.

Figure 7B:
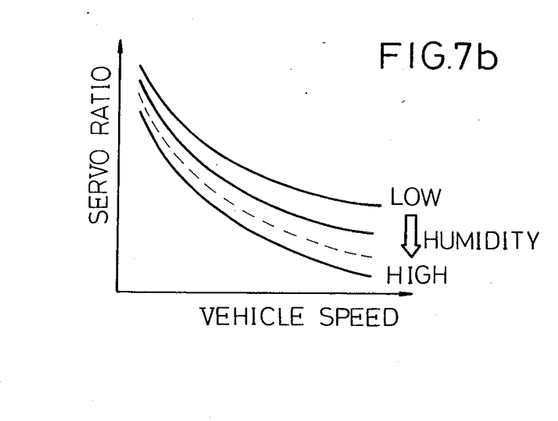
FIG. 7b is a graph illustrating operating characteristics of relative humidity in relatin to vehicle speed and the servo ratio.

In this embodiment, a vehicle speed signal SP is also applied to the input terminal of the differential amplifier S1 as well as the relative humidity signal (RH). Therefore, as the vehicle speed increases, the additional torque needed to be generated by the power steering equipment also becomes smaller. In this connection, the operational characteristics of the electric power steering equipment of this embodiment are shown in FIG. 7b. In FIG. 7b, servo ratio is the ratio of the total steering torque (manual steering torque plus additional torque) to the manual steering torque, wherein the manual steering torque stands for the torque to be applied to the first steering shaft 2 by the driver and the additional torque stands for the torque to be generated by the power steering equipment. In other words, the electric power steering equipment of this embodiment can output a predetermined additional torque determined by being based on both the vehicle speed and the degree of wetness on the road surface. Therefore, the steering feeling which a driver experiences, does not greatly change even when the vehicle speed and the condition of the road surface (the degree of wetness on the surface) change.

Figure 8A:
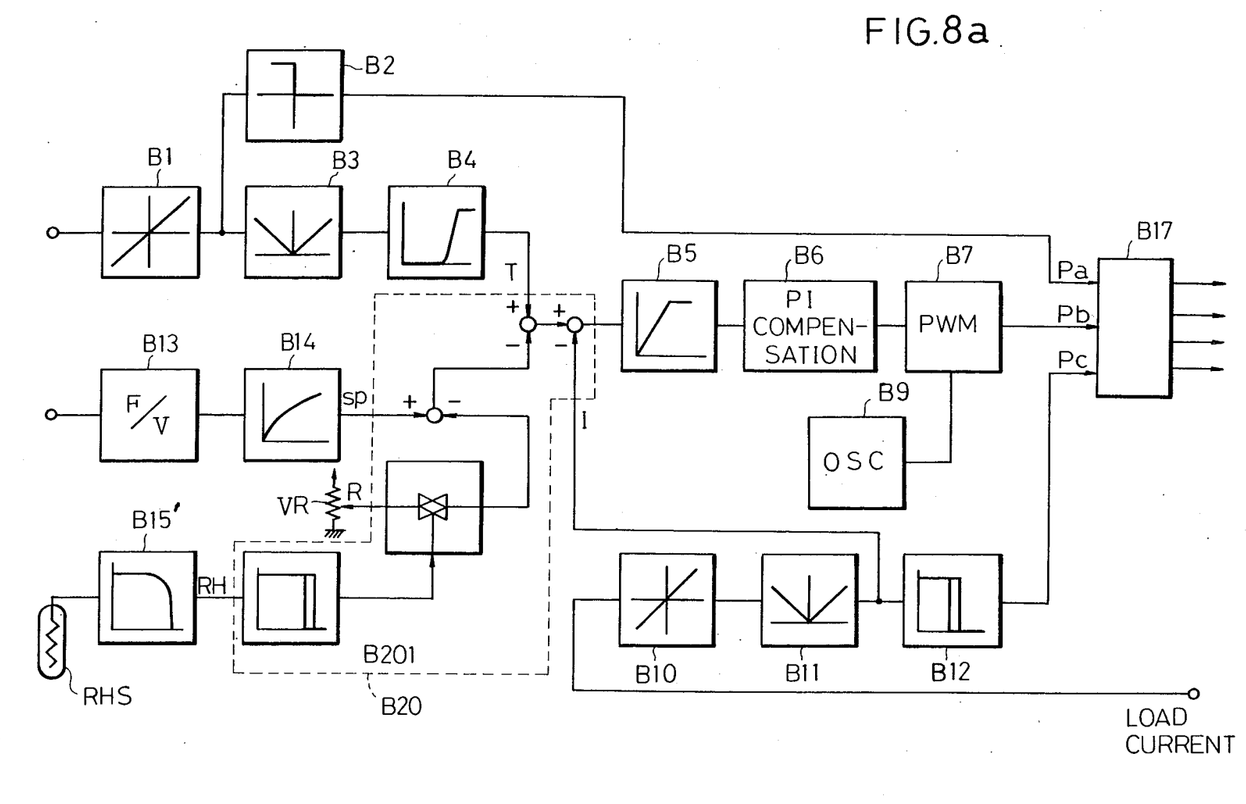
FIG. 8a is a schematic block diagram illustrating part of an electric circuit for another embodiment according to the present invention.
Figure 9:
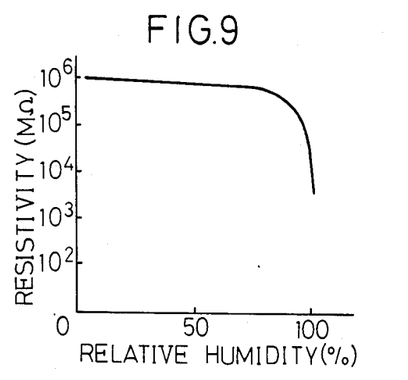
FIG. 9 is a graph illustrating a characteristic of a relative humidity sensor with negative humidity characteristics.

In FIG. 8a, there is illustrated another embodiment of this invention. In this embodiment a relative humidity sensor RHS with negative characteristics is employed, namely, the resistivity decreases as the relative humidity to which the sensor is exposed increases. The resistivity of the relative humidity sensor rapidly changes within a relatively narrow range of relative humidity as illustrated in FIG. 9. In this negative characteristic sensor, therefore, it is difficult to detect the degree of the wetness of the road surface in a continuous fashion over a wide range of wetness conditions. As a result, in this embodiment, it is determined whether the road is wet or dry in a binary manner and based on this distinguishing determination, it is possible to select the operating characteristic of the electric power steering equipment so as to be limited to either the operating characteristic appropriate for dry road conditions or the operating characteristic needed under wet road conditions.

In FIG. 8a, there is illustrated the component block B20 which differs from the embodiment of FIG. 2. The detail of block B20 is illustrated in FIG. 8b.

Figure 8B:
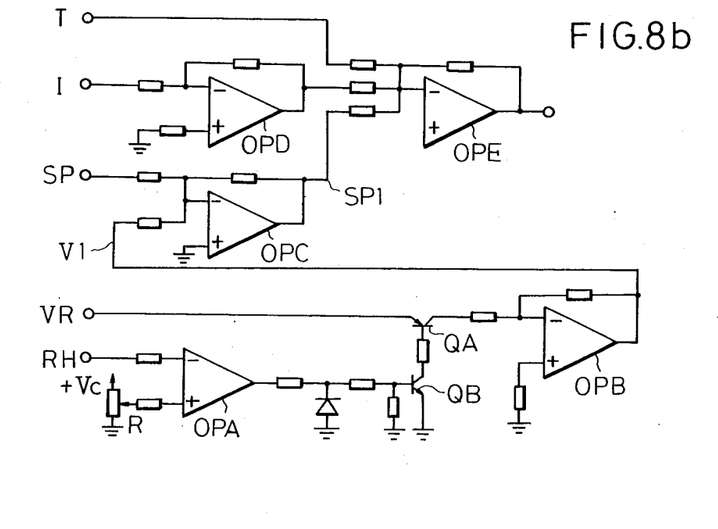
Figure 8C:
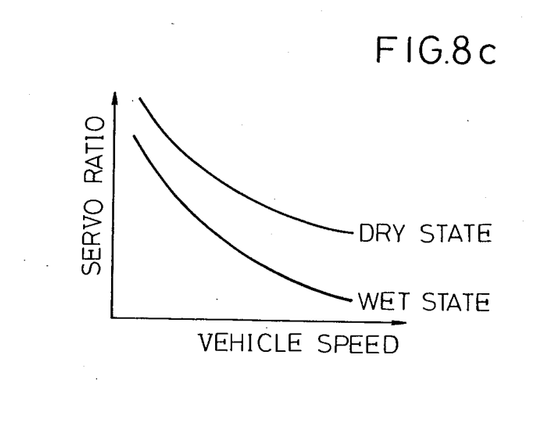

Referring now to FIGS. 8a and 8b, the relative humidity signal RH is compared with a predetermined level in an analogue comparator OPA thereby to generate a binary signal in response to the condition of the road (either dry or wet). The level of the relative humidity signal RH decrease as the relative humidity increases, as shown in block B15' of FIG. 8a. Accordingly, the output signal level of the analogue comparator OPA becomes low level L when the relative humidity exceeds the reference humidity. In a dry state, comparator OPA outputs a high level signal and transistor QB and QA turn ON. To an analogue signal input terminal of the transistor QA, there is applied a signal of predetermined level preset by a variable resistor VR. This analogue signal level is applied to an inversion terminal of the comparator OPB via the transistor QA and is amplified. The output signal of comparator OPB is applied to an inversion terminal of a comparator OPC and the speed signal SP is also applied to OPC. Therefore, the level of the speed signal SP is added to the output signal (V1) and is amplified by the comparator OPC. The modified speed signal SP1 is outputted from the comparator OPC. The absolute level of modified speed signal SP1 is lower by a predetermined value in a dry state than in a wet state. Accordingly the absolute level of the output signal of a comparator OPE is lower in a wet state than in a dry state at the same speed, and the servo ratio with respect to speed in a wet state is smaller than that in a dry state. As a result, there is obtained the characteristic as shown in FIG. 8c. Either of these characteristic curves is selected in accordance with the state of the road surface, i.e., wet or dry.

Figure 10A:
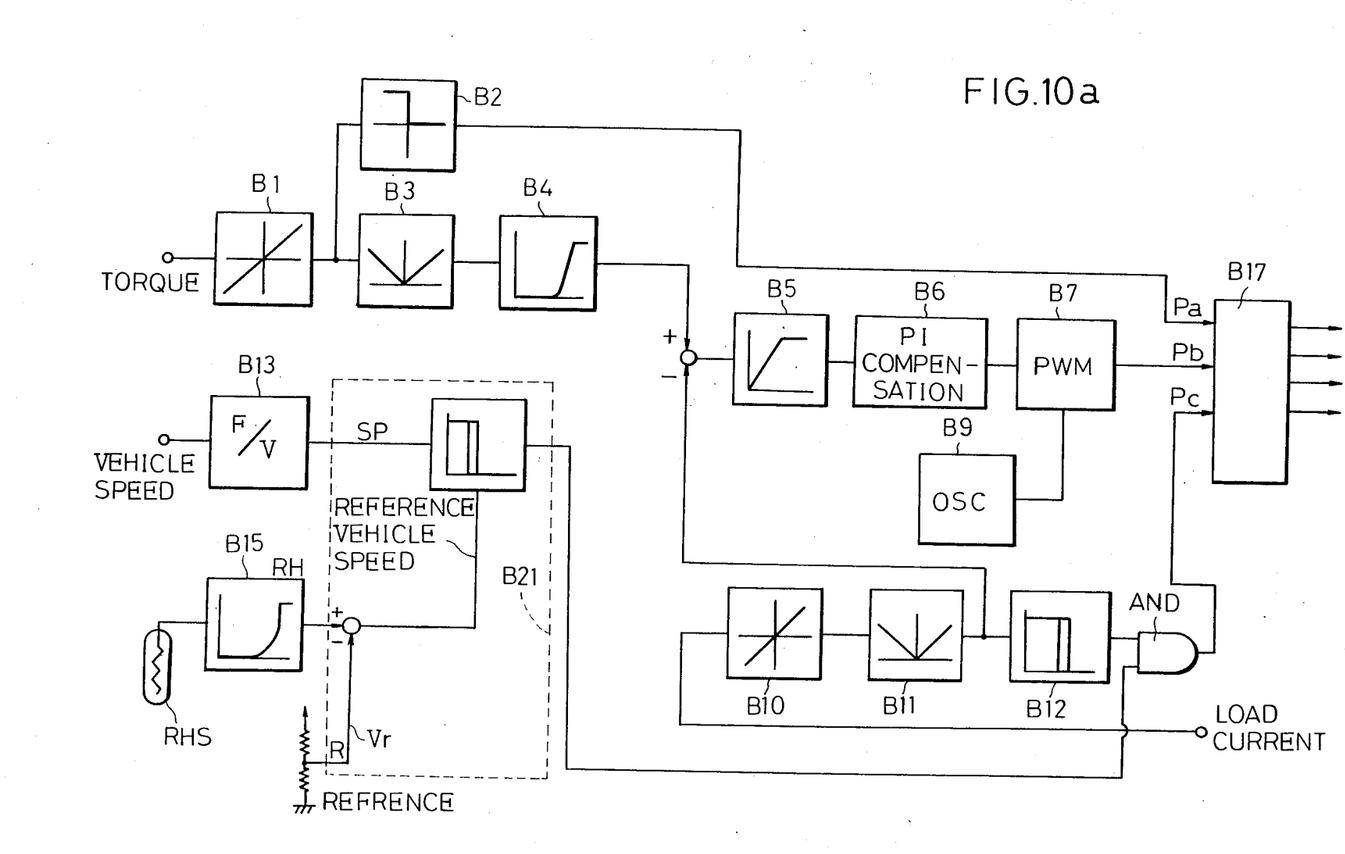
FIG. 10a is a schematic block diagram illustrating part of an electric circuit for still another embodiment according to the present invention.

In FIG. 10a, there is illustrated still another embodiment of this invention. In this embodiment, a relative humidity sensor RHS with a positive characteristic is employed and when the vehicle speed is not in excess of a predetermined reference vehicle speed, the needed additional torque is generated in accordance with the manual steering torque applied to the first steering shaft. On the other hand, when the vehicle speed exceeds the predetermined reference vehicle speed, generation of the additional torque is prohibited. In this case, this predetermined reference vehicle speed can be changed in accordance with the output of the relative humidity sensor RHS. Therefore, when the road is dry, the predetermined reference vehicle speed is set high so as to generate the additional torque even when the actual vehicle speed is relatively high, but when the road is wet, the aforesaid predetermined reference vehicle speed is set low so as to prohibit generation of the additional torque in accordance with the degree of wetness of the road even when the actual vehicle speed is relatively low.

Figure 10B:
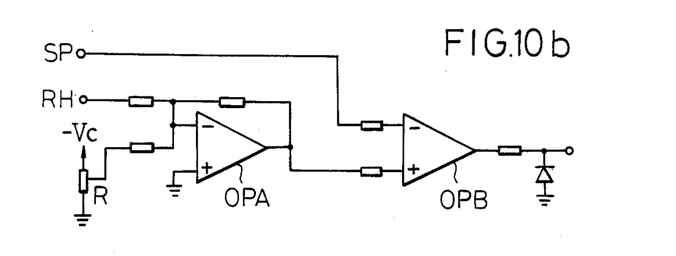

In FIG. 10a, parts differing from those of the foregoing embodiments are illustrated as block B21 and and AND gate "AND", respectively. The detail of block B21 is illustrated in FIG. 10b. The operation of this embodiment will be explained with reference to FIGS. 10a and 10b.

The relative humidity signal RH is added to an output R of a variable resistor by means of which a reference value is predetermined, to be amplified in an operational amplifier OPA, whereby the output signal level of OPA establishes a reference vehicle speed level for the vehicle speed signal SP.

The level of the vehicle speed signal SP is compared with the aforesaid reference vehicle speed level by an analogue comparator OPB and when the level of the vehicle speed signal SP is lower than the reference speed level, the output of the analogue comparator OPB becomes high level H. On the other hand, when the level of the signal SP is higher than the reference speed level, the output of the comparator OPB is inverted thereby to output a signal of low level L.

Figure 10C:
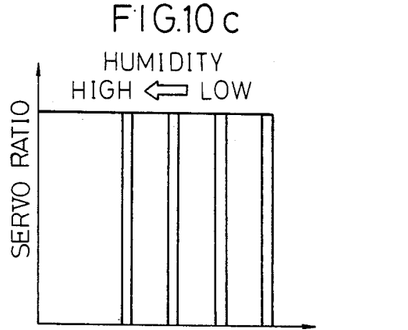

The AND gate "AND" (FIG. 10a) controls the ON/OFF of the driving motor. Namely, when either the output of block B12 or the output of block B21 is at the low level L, the low level signal L is applied to the input terminal Pc of the logic control circuit B17 thereby to prohibit generation of additional torque. In this case, the prohibition action against generating the additional torque is effected in a binary manner (ON or OFF) by comparing detected vehicle speed with the reference speed level which varies in accordance with the state of road surface. As a result, the characteristic as shown in FIG. 10c is obtained.

Figures 11A, 11B:
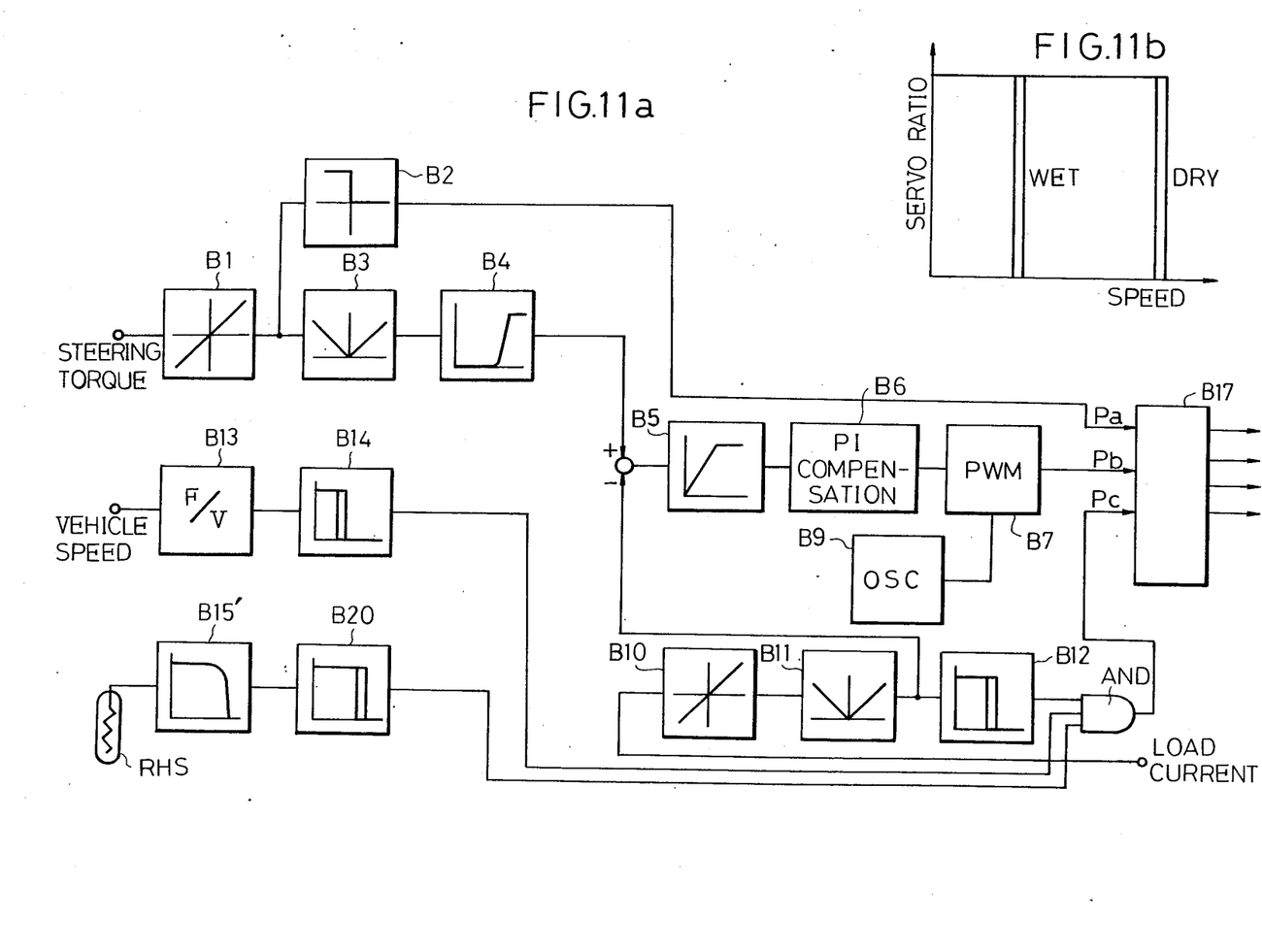

In FIG. 11a, there is illustrated a further embodiment of this invention. In this embodiment, a relative humidity sensor RHS with negative humidity characteristics is employed. Referring now to FIG. 11a, an output signal from the relative humidity sensor RHS is processed in a function generator B15′ and then it is converted into a binary signal in an analogue comparator B20 to be applied to an input terminal of an AND gate "AND". In this case, a three-input type of AND gate is employed as the AND gate "AND" and therefore, an overcurrent signal, a vehicle speed signal and a relative humidity signal (each of which is composed of a binary signal) are applied to AND gate "AND". In this embodiment, the AND gate "AND" controls the ON/OFF of the motor drive. When any one of the aforesaid three signals exists at low level L, the output signal level of the AND gate "AND" also becomes low level L so that a signal of low level L is applied to the input terminal Pc of the logic control circuit B17 thereby to prohibit generation of the additional torque.

Accordingly, a shown in FIG. 11b, in the case where the road is in a dry condition, generation of the additional torque is prohibited when the vehicle speed exceeds a predetermined reference vehicle speed. On the other hand, in the case where the road is in a wet condition, generation of the additinal torque is prohibited regardless of the vehicle speed.

In the foregoing embodiments, a ceramic humidity sensor is employed as the wetness detecting means. However, any other means may be also employed for this purpose, if it is possible to detect wetness on the road in a direct or indirect manner, such as other kinds of humidity sensors, optical sensors or the like.

As described above, according to the present invention, wetness on the road is detected directly or indirectly and based on the detected results, an additional torque necessary for the steering operation is generated. Therefore, a driver can drive a vehicle with a constant steering feeling at all times.

We claim:

1. Improved electric power steering equipment for a vehicle comprising:
    an electric motor:
    coupling means for coupling a steering shaft and said electric motor;
    torque detecting means for detecting the steering torque manually applied to said steering shaft by a driver;
    vehicle speed detecting means for detecting the vehicle speed;
    at least one wetness detecting means for detecting a physicl property with respect to wetness of a road surface adjacent to the vehicle; and
    control means for driving said electric motor in response to the output signals of said torque detecting means, said wetness detecting means and said vehicle speed detecting means, said control means comprising:
    a torque signal processing means connected to said torque detecting means which outputs a steering torque signal of a predetermined function in response to an absolute value of the signal detected by said torque detecting means and which in turn outputs a polarity signal coded to binary level in accordance with the polarity of the steering torque detected by said torque detecting means;
    a vehicle speed signal processing means connected to said vehicle speed detecting means which outputs a vehicle speed signal having a predetermined relation to the vehicle speed detected by said vehicle speed detecting means;
    a wetness signal processing means connected to said wetness detecting means which outputs a wetness signal having a predetermined relation to the output of said wetness detecting means;
    a load current detecting means which detects a load current being supplied to said electric motor to output an absolute value signal to load current in response to an absolute value of said load current, and which in turn detects an overcurrent of said load current to output an overcurrent detecting signal;

a differential signal processing means which comprises:

a differential amplifier circuit connected to each of said torque signal processing means, said vehicle speed signal processing means, said wetness signal processing means and said load current detecting means, to which the vehicle speed signal, the wetness signal and the load current absolute value signal are inputted as compensation signals for the steering torque signal and which amplfies the difference between these input signals to generate an output signal therefrom, and a pulse width modulation circuit which performs pulse width modulation in response to the level of the output signal from said differential amplifier circuit;

a logic control circuit to which said polarity signal of the steering torque, said output signal of said pulse width modulation circuit and said overcurrent detecting signal are inputted and which transmits the output signal of said pulse width modulation circuit to a predetermined output signal of the logic control circuit in response to said input signals; and a motor drive circuit connected to said logic control circuit which supplies load current to said electric motor in response to the input signal applied thereto.

2. Improved electric power steering equipment for a vehicle comprising:

an electric motor;

torque detecting means for detecting the steering torque manually applied to the vehicle steering shaft by a driver;

at least one wetness detecting means for detecting a physical property with respect to wetness of a road surface adjacent to the vehicle:

vehicle speed detecting means for detecting the vehicle speed;

a torque signal processing means connected to said torque detecting means which outputs a steering torque signal of a predetermined function in response to an absolute value of the signal detected by said torque detecting means and which in turn outputs a polarity signal coded to binary level in accordance with the polarity of the steering torque detected by said torque detecting means;

a vehicle speed signal processing means connected to said vehicle speed detecting means which outputs a vehicle speed signal having a predetermined relation to the vehicle speed detected by said vehicle speed detecting means;

a wetness signal processing means connected to said wetness detecting means which outputs a wetness signal having a predetermined relation to the output of said wetness detecting means;

a differential signal processing means connected to each of said torque signal processing means, said vehicle speed signal processing means and said wetness signal processing means to which the vehicle speed signal and the wetness signal are inputted as compensation signals for the steering torque signal and which amplifies the difference between these input signals to generate an output signal therefrom;

a pulse width modulation circuit which performs pulse width modulation in response to the level of the output signal from said differential amplifier circuit;

a logic control circuit to which said polarity signal of the steering torque and said output signal of said pulse width modulation circuit are inputted and which transmits the output signal of said pulse width modulation circuit to a predetermined output signal of the logic control circuit in response to said input signals; and a motor drive circuit connected to said logic control circuit which supplies load current to said electric motor in response to the input signal applied thereto.

3. Improved electric power steering equipment for a vehicle comprising:

an electric motor;

torque detecting means for detecting the steering torque manually applied to to vehicle steering shaft by a driver;

at least one wetness detecting means for detecting a physical property with respect to wetness of a road surface adjacent to the vehicle;

vehicle speed detecting means for detecting the vehicle speed;

a torque signal processing means connected to said torque detecting means which outputs a steering torque signal of a predetermined function;

a vehicle speed signal processing means connected to said vehicle speed detecting means which outputs a vehicle speed signal having a predetermined relation to the vehicle speed detected by said vehicle speed detecting means;

a wetness signal processing means connected to said wetness detecting means which outputs a wetness signal having a predetermined relation to the output of said wetness detecting means;

a differential signal processing means connected to each of said torque signal processing means, said vehicle speed signal processing means and said wetness signal processing means, to which the vehicle speed signal and the wetness signal are inputted as compensation signals for the steering torque signal, and which decreases the output signal therefrom when one of the vehicle speed signal and wetness signal increases; and a pulse width modulation circuit means which performs pulse width modulation in response to the level of the output signal from said differential signal processing means and drives said electric motor.

4. Improved electric power steering equipment according to claim 2, wherein said control means prohibit drive of said electric motor when the vehicle speed exceeds a predetermined vehicle speed, and said predetermined vehicle speed is set in response to the output of said wetness detecting means.

5. Improved electric power steering equipment according to claim 2, wherein said control means distinguishingly determines the degree of wetness of a road surface in a binary manner such as between wet or dry states, and controls the driving force of said electric motor in response to the characteristic curve of a servo ratio with respect to said vehicle speed which is defined by said binary state of the wetness or dryness of a road surface.

6. Improved electric power steering equipment according to claim 2, wherein
said control means includes:
a first comparator for comparing the wetness detected by said wetness detecting means with a predetermined value to output a binary signal; and
a second comparator for comparing the vehicle speed detected by said vehicle speed detecting means with a predetermined speed to output another binary signal; and
said control means drives said electric motor based on the output binary signals from said first and second comparators only when the vehicle speed is lower than the predetermined speed and the degree of wetness is smaller than the predetermined wetness value.

7. Improved electric power steering equipment according to claim 1, wherein
said torque signal processing means comprises:
a linear amplifier which amplifies the output signal of said torque detecting means;
an absolute value circuit connected to an output terminal of said linear amplifier to output a signal representing an absolute value of an input signal;
a function generator which is connected to said absolute value circuit and outputs a signal of a predetermined function with respect to an input signal; and
a polarity judging circuit which is connected to said linear amplifier circuit and outputs a binary signal in response to polarity of an input signal.

8. Improved electric power steering equipment according to claim 1, wherein
said vehicle speed signal processing means comprises:
a frequency-voltage conversion circuit connected to said vehicle speed detecting means; and
a function generator connected to said frequency-voltage conversion circuit.

9. Improved electric power steering equipment according to claim 1, wherein
said load current detecting means comprises:
a current transformer connected to said electric motor to detect the load current flowing through said electric motor;
a linear amplifier connected to said current transformer;
an absolute value circuit connected to said linear amplifier to output an absolute value signal of an output signal from said linear amplifier; and
an overcurrent detecting means connected to said absolute circuit.

10. Improved electric power steering equipment according to claim 1, wherein
said motor drive circuit comprises:
a switching circuit which supplies a load current the duty ratio of which is controlled in response to an output signal from said logic control circuit to said electric motor.

11. Improved electric power steering equipment according to claim 1, wherein
said wetness signal processing means includes a binary signal generating circuit which outputs a signal having a binary level representing dry or wet conditions of a vehicle or road surface adjacent to the vehicle in response to the output of said wetness detecting means.

12. Improved electric power steering equpment according to claim 1, wherein
said vehicle speed signal processing means includes a comparative circuit which compares the vehicle speed detected by said vehicle speed detecting means with a reference value to output a binary signal in response to whether said vehicle speed exceeds said reference value or not; and
said wetness signal processing means includes a variable reference value generating circuit which generates said reference value varying in response to the output of said wetness detecting means.

13. Improved electric power steering equipment according to claim 1, wherein
said vehicle speed signal processing means includes a first comparator which compares the vehicle speed detected by said vehicle speed detecting means with a predetermined first reference value to output a binary signal therefrom in response to whether said vehicle speed exceeds said first reference value or not.
said wetness signal processing means includes a second comparator which compares the degree of wetness detected by said wetness detecting means with a predetermined second reference value to output a binary signal presenting a dry or wet condition in response to whether said degree of wetness exceeds said second reference value or not, and
each of the output terminals of said first and second comparators is connected to one of the input terminals of said logic control circuit via a logic circuit thereby to stop driving said electric motor when either said degree of wetness or said vehicle speed is in excess of each of said reference values.

14. Improved electric power steering equipment according to claim 2 wherein said differential signal processing means comprises a differential amplifier circuit which decreases an output signal therefrom when one of the vehicle speed signal and wetness signal increases.

15. Improved electric power steering equipment according to claim 3 wherein
said wetness signal processing means includes a binary signal generating circuit which outputs a signal having a binary level representing dry and wet conditions, respectively, of a vehicle or road surface adjacent to the vehicle in response to the output of said wetness detecting means.

16. Improved electric power steering equipment according to claim 3 wherein
said vehicle speed signal processing means includes a comparative circuit which compares the vehicle speed detected by said vehicle speed detecting means with a reference value to output a binary signal in response to whether said vehicle speed exceeds said reference value or not; and
said wetness signal processing means includes a variable reference value generating circuit which generates said reference value varying in response to the output of said wetness detecting means.

17. Improved electric power steering equipment according to claim 3 wherein
said vehicle speed signal processing means includes a first comparator which compares the vehicle speed detected by said vehicle speed detecting means with a predetermined first reference value to output a binary signal therefrom in response to whether said vehicle speed exceeds said first reference value or not;

said wetness signal procesing means includes a second comparator which compares the degree of wetness detected by said wetness detecting means with a predetermined second reference value to output a binary signal presenting dry and and wet conditions, respectively, in response to whether said degree of wetness exceeds said second reference value or not; and each of the output terminals of said first and second comparators is connected to one of the input terminals of a logic control circuit via a logic circuit thereby to stop driving said electric motor when one of said degree of wetness and said vehicle speed is in excess of each of said reference values.

* * * * *